United States Patent
Shimizu et al.

(10) Patent No.: US 8,630,062 B2
(45) Date of Patent: Jan. 14, 2014

(54) BEARING APPARATUS HAVING CONCENTRIC INNER AND OUTER ROLLER BEARINGS AND INFORMATION RECORDING/REPRODUCING APPARATUS

(75) Inventors: Sumio Shimizu, Chiba (JP); Robert Gordon Smith, Pathumthani (TH)

(73) Assignees: Seiko Instruments Inc. (JP); Seiko Instruments (Thailand) Ltd. (JP)

( * ) Notice: Subject to any disclaimer, the term of this patent is extended or adjusted under 35 U.S.C. 154(b) by 0 days.

(21) Appl. No.: 13/598,825

(22) Filed: Aug. 30, 2012

(65) Prior Publication Data
US 2013/0057984 A1 Mar. 7, 2013

(30) Foreign Application Priority Data
Sep. 6, 2011 (JP) ................................ 2011-193939

(51) Int. Cl.
*G11B 17/08* (2006.01)
*F16C 19/04* (2006.01)

(52) U.S. Cl.
USPC .......................... 360/99.08; 384/461; 384/504

(58) Field of Classification Search
USPC ......... 360/98.07, 99.04, 99.08; 310/90, 67 R; 384/418, 456, 461, 494, 504, 548
See application file for complete search history.

(56) References Cited

U.S. PATENT DOCUMENTS

| | | | | |
|---|---|---|---|---|
| 3,737,202 A | * | 6/1973 | Rosales | 384/461 |
| 3,811,742 A | * | 5/1974 | Rosales | 384/461 |
| 4,643,047 A | * | 2/1987 | Distin et al. | 475/168 |
| 5,138,477 A | * | 8/1992 | Omura et al. | 359/200.1 |
| 5,228,845 A | * | 7/1993 | Steele | 418/55.1 |
| 5,394,283 A | * | 2/1995 | Hans et al. | 360/98.07 |
| 5,606,475 A | * | 2/1997 | Ishizuka | 360/99.08 |
| 5,820,272 A | * | 10/1998 | Nashiki et al. | 384/461 |
| 5,945,751 A | * | 8/1999 | Hans et al. | 310/67 R |
| 6,115,213 A | * | 9/2000 | Ikeda et al. | 360/99.08 |
| 6,687,092 B2 | * | 2/2004 | Kan et al. | 360/265.2 |
| 6,741,428 B1 | * | 5/2004 | Oveyssi | 360/265.6 |
| 2012/0141058 A1 | * | 6/2012 | Radinger et al. | 384/461 |

FOREIGN PATENT DOCUMENTS

JP 10318255 12/1998

* cited by examiner

*Primary Examiner* — Brian Miller
(74) *Attorney, Agent, or Firm* — Adams & Wilks

(57) ABSTRACT

An inner race of a first rolling bearing is fixed to a shaft, and an outer race thereof is fixed to an inner race of a second rolling bearing. In the first bearing, the outer race and rolling elements contact each other on the side of a center of the rolling elements closer to one end side in an axial direction, and the inner race and the rolling elements contact each other on the side of the center of the rolling elements closer to the other end side in the axial direction. In the second bearing, an outer race and rolling elements contact each other on the side of a center of the rolling elements closer to the one end side, and the inner race and the rolling elements contact each other on the side of the center of the rolling elements closer to the other end side.

5 Claims, 4 Drawing Sheets

BEARING APPARATUS HAVING CONCENTRIC INNER AND OUTER ROLLER BEARINGS AND INFORMATION RECORDING/REPRODUCING APPARATUS

TECHNICAL FIELD

The present invention relates to a bearing apparatus and an information recording/reproducing apparatus having the same.

DESCRIPTION OF THE RELATED ART

Conventionally, an information recording/reproducing apparatus is known such as a hard disk for storing and reproducing various types of information on and from a disk (magnetic recording medium). In general, the information recording/reproducing apparatus includes a head gimbal assembly having a slider for recording and reproducing signals on and from a disk, and an arm (pivotal member) having the head gimbal assembly mounted closer to a tip. The arm can be pivoted on a bearing apparatus provided closer to a base end. The arm can be pivoted to move the slider to a predetermined position over the disk to record or reproduce the signals.

The bearing apparatus as described above has a shaft, a pair of rolling bearings fitted externally to the shaft and placed side by side in an axial direction of the shaft, and a cylindrical spacer placed coaxially with the shaft and placed inside the pair of rolling bearings in an axial direction thereof. In some cases, the pair of rolling bearings are placed such that a ring protrusion formed to protrude from a sleeve toward the inside in a diameter direction is sandwiched between the rolling bearings, instead of the spacer.

In such a bearing apparatus, a pre-load is applied to the rolling bearing in the axial direction to provide no gap or a negative inner gap between an outer race, an inner race, and a rolling element to enhance the rigidity of the rolling bearing.

In recent years, for a further reduction in the thickness of the information recording/reproducing apparatus, the bearing apparatus incorporated in the information recording/reproducing apparatus also needs to be reduced in thickness.

Thus, for example, JP-A-10-318255 describes a structure in which an inner race of each rolling bearing has a width in an axial direction set to be smaller than that of an outer race. According to this configuration, even when each rolling bearing is installed on a shaft such that the outer races are in contact with each other without a spacer or the like interposed, space for applying a pre-load is formed between the inner races, which can achieve the reduction in thickness of the bearing apparatus.

However, the rolling bearings are placed side by side along the axial direction in the structure of JP-A-10-318255 described above, so that the thickness can not be reduced to the width of the two rolling bearings along the axial direction or smaller.

Since the rolling bearing described in JP-A-10-318255 is a special rolling bearing in which the inner races and the outer races have different widths, it has the problem of being more expensive than standard rolling bearings.

While a possible approach to the realization of a further reduction in thickness is to reduce the width of the rolling bearing along the axial direction, there is a limit in design. Particularly, the reduction in the width requires a reduction in the size of a rolling element held between outer and inner races, but the reduced size of the rolling element presents the problem of less rigidity. As a result, the performance of the information recording/reproducing apparatus may be reduced.

SUMMARY OF THE INVENTION

The present invention has been made in view of the aforementioned circumstances, and it is an object thereof to provide a bearing apparatus and an information recording/reproducing apparatus with a reduced thickness and at a lower cost while rigidity is maintained.

According to the present invention, a bearing apparatus includes a shaft, a first rolling bearing fitted externally to the shaft, a second rolling bearing having a larger diameter than that of the first rolling bearing and fitted externally to the first rolling bearing, and a support portion supporting an outer race of the second rolling bearing on one end side in an axial direction, wherein an inner race of the first rolling bearing is fixed to the shaft, and an outer race of the first rolling bearing is fixed to an inner race of the second rolling bearing, in the first rolling bearing, the outer race and a rolling element are in contact with each other on the side of a center of the rolling element closer to the one end side in the axial direction, and the inner race and the rolling element are in contact with each other on the side of the center of the rolling element closer to the other end side in the axial direction, and in the second rolling bearing, the outer race and a rolling element are in contact with each other on the side of a center of the rolling element closer to the one end side in the axial direction, and the inner race and the rolling element are in contact with each other on the side of the center of the rolling element closer to the other end side in the axial direction.

According to the structure, the width of the bearing apparatus in the axial direction can be reduced while maintaining the performance of the bearing apparatus as compared with the conventional case where the first rolling bearing and the second rolling bearing are placed side by side in the axial direction. This can reduce the thickness of the bearing apparatus.

Since the two rolling bearings having different diameters (nominal diameters) are combined, the bearing apparatus can be provided at a lower cost without requiring the use of a special rolling bearing described in JP-A-10-318255.

Since the rolling bearing does not need to be reduced in thickness, the rigidity of the rolling bearing can be maintained.

The first rolling bearing is placed to protrude from the second rolling bearing toward the other end side along the axial direction.

According to the structure, since the first rolling bearing is fixed to protrude from the second rolling bearing toward the other end in the axial direction, a pre-load applied to each of the rolling bearings is substantially linear. This can further increase the rigidity of the bearing apparatus to suppress a rattle or a shift of the bearing apparatus especially when a load is applied along the axial direction.

The shaft and the support portion are integrally formed.

According to the structure, the integral formation of the shaft and the support portion can reduce the number of parts. Since the positioning of the shaft and the support portion is easily performed, the installation of the first rolling bearing and the second rolling bearing can be facilitated.

According to the present invention, an information recording/reproducing apparatus includes the bearing apparatus according to the present invention, a housing connected to the shaft, a pivotal member fixed to at least one of the outer race of the first rolling bearing and the inner race of the second rolling bearing, and a slider mounted on the pivotal member and recording and reproducing information to and from a magnetic recording medium.

According to the structure, since the bearing apparatus according to the present invention is included, the information recording/reproducing apparatus with a reduced thickness and a lower cost can be provided.

According to the bearing apparatus of the present invention, the bearing apparatus with a reduced thickness and at a lower cost can be provided while the rigidity is maintained.

According to the information recording/reproducing apparatus of the present invention, since the bearing apparatus according to the present invention is included, the information recording/reproducing apparatus can be provided with a reduced thickness and at a lower cost.

DETAILED DESCRIPTION OF THE INVENTION

In the following, preferred embodiments of the present invention will be described with reference to the accompanying drawings.

(Information Recording/Reproducing Apparatus)

Figure 1:
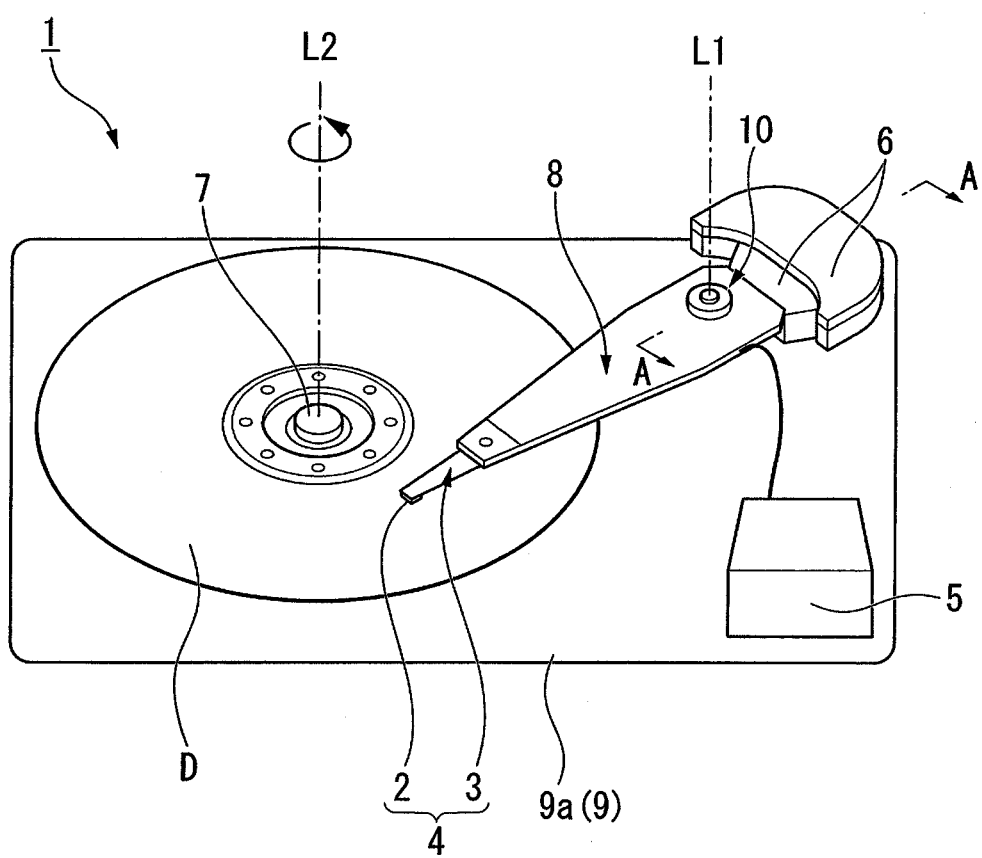
FIG. 1 is a perspective view of an information recording/reproducing apparatus.

FIG. 1 is a perspective view of an information recording/reproducing apparatus.

As shown in FIG. 1, an information recording/reproducing apparatus 1 is an apparatus which performs writing and reading to and from a disk (magnetic recording medium) D having a recording layer. The information recording/reproducing apparatus 1 includes an arm (pivotal member) 8, a head gimbal assembly 4 supported on the arm 8 closer to a tip, a slider 2 mounted on a tip of the head gimbal assembly 4, an actuator (VCM: Voice Coil Motor) 6 for moving the head gimbal assembly 4 for scanning, a spindle motor 7 for rotating a disk D, a control section 5 for supplying an electric current modulated on the basis of information to the slider 2, and a housing 9 accommodating those components.

The housing 9 is made of a metal material such as aluminum, has a box shape having an opening portion on the top, and is formed of a bottom wall 9a having a rectangular shape in plan view and peripheral walls (not shown) standing vertically from the edge portion of the bottom wall 9a. A recess portion for housing the abovementioned components is formed inside the housing 9 surrounded by the peripheral walls. The abovementioned spindle motor 7 is attached substantially to the center of the bottom wall 9a, and the disk D is removably fixed by fitting a center hole thereof to the spindle motor 7.

A bearing apparatus 10 is placed on the side of the disk D, and the arm 8 is pivotally supported on the bearing apparatus 10. One side of the arm 8 along its extending direction across the bearing apparatus 10 is connected to the abovementioned actuator 6. The other side of the arm 8 along the extending direction is provided in parallel with the surface of the disk D, and the head gimbal assembly 4 is connected to the tip. The head gimbal assembly 4 includes a suspension 3 and the slider 2 mounted on the tip of the suspension 3 and placed opposite to the surface of the disk D. The slider 2 includes a recording element for writing (recording) information to the disk D and a reproducing element for reading (reproducing) information from the disk D.

To record or reproduce the information in the information recording/reproducing apparatus 1 formed as described above, the spindle motor 7 is first driven to rotate the disk D around a central axis L2. The actuator 6 is driven to pivot the arm 8 around a central axis L1 of the bearing apparatus 10. This can move the slider 2 placed at the tip of the head gimbal assembly 4 to scan the surface of the disk D. The recording element or the reproducing element of the slider 2 can be driven to record or reproduce the information to and from the disk D.

(Bearing Apparatus)

Figure 2:
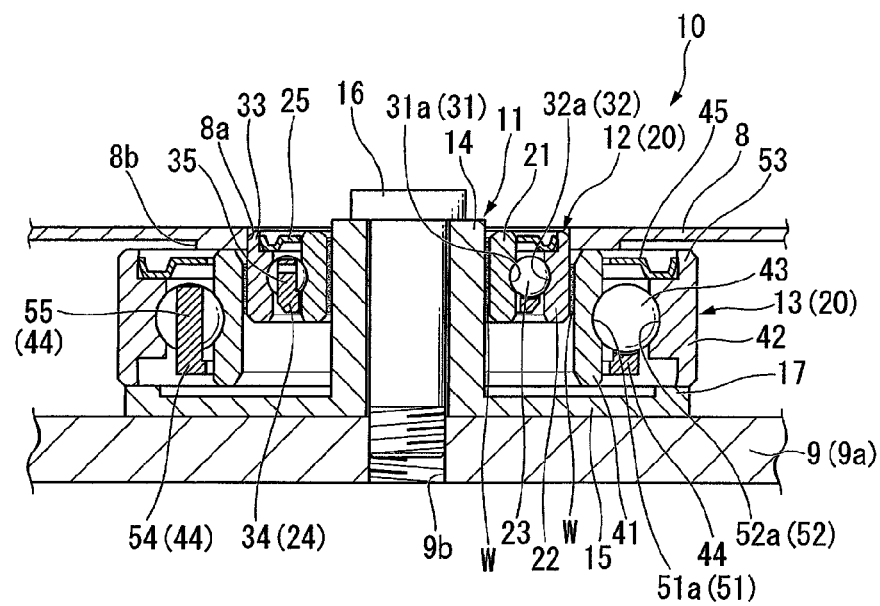
FIG. 2 is a side section view taken along a line A-A in FIG. 1.

FIG. 2 is a side section view taken along a line A-A in FIG. 1.

As shown in FIG. 2, the bearing apparatus 10 includes a base portion 11 and a rolling bearing 20 (a first rolling bearing 12 and a second rolling bearing 13) installed on the base portion 11. In the following description, a direction along the central axis L1 of the bearing apparatus 10 is referred to as an axial direction, a direction orthogonal to the axial direction as a diameter direction, and a direction around the axial direction as a circumferential direction.

The base portion 11 is provided by integrally forming a shaft 14 extending along the axial direction and a support portion 15 protruding from one end (lower side in FIG. 2) of the shaft 14 in the axial direction toward the outside in the diameter direction from a metal material such as aluminum and stainless steel.

The shaft 14 is formed in a cylindrical shape, and a bolt 16 is inserted therein from the other end in the axial direction. The bolt 16 is screwed into a female screw portion 9b formed in the bottom wall 9a of the housing 9 to fix the base portion 11 to the housing 9.

The support portion 15 is formed in an annular shape extending along the bottom wall 9a of the housing 9 and has a protruding portion 17 on its outer periphery protruding toward the other end in the axial direction. The protruding portion 17 is formed over the entire periphery of the support portion 15 and has an end surface flat along the diameter direction closer to the other end in the axial direction.

(Rolling Bearing)

The rolling bearing 20 has the first rolling bearing 12 fitted externally to the shaft 14 and the second rolling bearing 13 having a larger diameter than that of the first rolling bearing 12 and fitted externally to the first rolling bearing 12.

The first rolling bearing 12 includes an inner race 21 fixed to the shaft 14 by an adhesive W, an outer race 22 placed to surround the inner race 21 outside in the diameter direction, a plurality of rolling elements 23 placed between the inner race 21 and the outer race 22, a retainer 24 placed toward the one end in the axial direction of the rolling element 23 and rotatably holding the rolling elements 23, and a shield 25 placed toward the other end in the axial direction of the rolling elements 23 (upper side in FIG. 2) and filling the gap between the inner race 21 and the outer race 22.

Each of the inner race 21 and the outer race 22 is made of a metal material and has a cylindrical shape.

A rolling groove 31 recessed toward the inside in the diameter direction is formed at a central portion in the axial direction of the outer peripheral face of the inner race 21. The rolling groove 31 is formed over the entire periphery of the inner race 21. The inner face of the rolling groove 31 is formed as a rolling face 31a, and the section face along the axial direction of the rolling face 31a is formed in an arc shape.

A rolling groove 32 recessed toward the outside in the diameter direction is formed at a central portion in the axial direction of the inner peripheral face of the outer race 22. The rolling groove 32 is formed over the entire periphery of the outer race 22. The inner face of the rolling groove 32 is formed as a rolling face 32a, and the section face along the axial direction of the rolling face 32a is formed in an arc shape.

The rolling elements 23 are made of a metal material and have a spherical shape. The rolling elements 23 are placed inside each of the rolling grooves 31 and 32 and roll along each of the rolling grooves 31 and 32. The radius of curvature of each of the rolling faces 31a and 32a is formed to be equal to the radius of curvature of the outer circumferential face of the rolling element 23.

A large-diameter portion 33 is formed at the other end in the axial direction of the outer race 22 and has an increased inner diameter as compared with the one end in the axial direction. The large-diameter portion 33 is formed over the entire periphery in the circumferential direction.

The shield 25 is an annular member closing between the inner race 21 and the outer race 22 from the other end in the axial direction and is mounted on the outer race 22 with the outer peripheral portion fitted inside the abovementioned large-diameter portion 33. The inner peripheral portion of the shield 25 is separated from the inner race 21 to allow a relative displacement between the inner race 21 and the outer race 22 along the axial direction.

The retainer 24 is made of a resin material or the like and has a crown shape. Specifically, the retainer 24 includes a ring portion 34 placed toward the one end in the axial direction of the rolling element 23 between the inner race 21 and the outer race 22 and placed coaxially with the shaft 14 and a rolling-element holding portion 35 protruding from the ring portion 34 toward the other end in the axial direction. A plurality of rolling-element holding portions 35 are formed at intervals in the circumferential direction such that the rolling elements 23 can be held rotatably between each of the rolling-element holding portions 35.

The second rolling bearing 13 includes an inner race 41 fixed to the outer race 22 of the first rolling bearing 12, an outer race 42 placed to surround the outside of the inner race 41 in the diameter direction, a plurality of rolling elements 43 placed between the inner race 41 and the outer race 42, a retainer 44 placed toward the one end in the axial direction of the rolling elements 43 and rotatably holding the rolling elements 43, and a shield 45 placed toward the other end in the axial direction of the rolling elements 43 and filling the gap between the inner race 41 and the outer race 42.

The inner race 41 is formed to have an inner diameter equal to or larger than that of the outer race 22 of the first rolling bearing 12, and the inner peripheral face of the inner race 41 is fixed to the outer peripheral face of the outer race 22 of the first rolling bearing 12 by an adhesive W. The abovementioned first rolling bearing 12 is fixed so as to protrude from the second rolling bearing 13 toward the other end in the axial direction. A rolling groove 51 recessed toward the inside in the diameter direction is formed at a central portion in the axial direction of the outer peripheral face of the inner race 41. The rolling groove 51 is formed over the entire peripheral of the inner race 41. The inner face of the rolling groove 51 is formed as a rolling face 51a, and the section face along the axial direction of the rolling face 51a is formed in an arc shape.

A rolling groove 52 recessed toward the outside in the diameter direction is formed at a central portion in the axial direction of the inner peripheral face of the outer race 42. The rolling groove 52 is formed over the entire peripheral of the outer race 42. The inner face of the rolling groove 52 is formed as a rolling face 52a, and the section face along the axial direction of the rolling face 52a is formed in an arc shape. A large-diameter portion 53 is formed at each end in the axial direction of the outer race 42 and has an inner diameter increased as compared with a central portion in the axial direction.

The shield 45 is formed of the same structure as that of the shield 25 of the first rolling bearing 12 described above, and is fitted inside the large-diameter portion 53 on the other end along the axial direction to be mounted on the outer race 42.

The retainer 44 has the same the structure as that of the retainer 24 of the first rolling bearing 12 described above, is placed toward the one end in the axial direction of the rolling elements 43 between the inner race 41 and the outer race 42, and includes a ring portion 54 placed coaxially with the shaft 14 and a rolling-element holding portion 55 protruding from the ring portion 54 toward the other end in the axial direction to hold the rolling element 43.

The end face on the one end in the axial direction of the outer race 42 is fixed to the abovementioned protruding portion 17 of the base portion 11 in contact therewith to regulate the movement of the outer race 42 toward the one end along the axial direction. Each of the inner race 41 and the rolling elements 43 of the second rolling element 13 is placed at an interval from the support portion 15 in the axial direction.

In this manner, in the bearing apparatus 10 of the present embodiment, the inner race 21 of the first rolling bearing 12 and the outer race 42 of the second rolling bearing 13 are fixed relatively to the base portion 11, and the outer race 22 of the first rolling bearing 12 and the inner race 41 of the second rolling bearing 13 are fixed to each other. The outer race 22 of the first rolling bearing 12 and the inner race 41 of the second rolling bearing 13 are constructed to rotate relative to the inner race 21 of the first rolling bearing 12 and the outer race 42 of the second rolling bearing 13.

Figure 3:
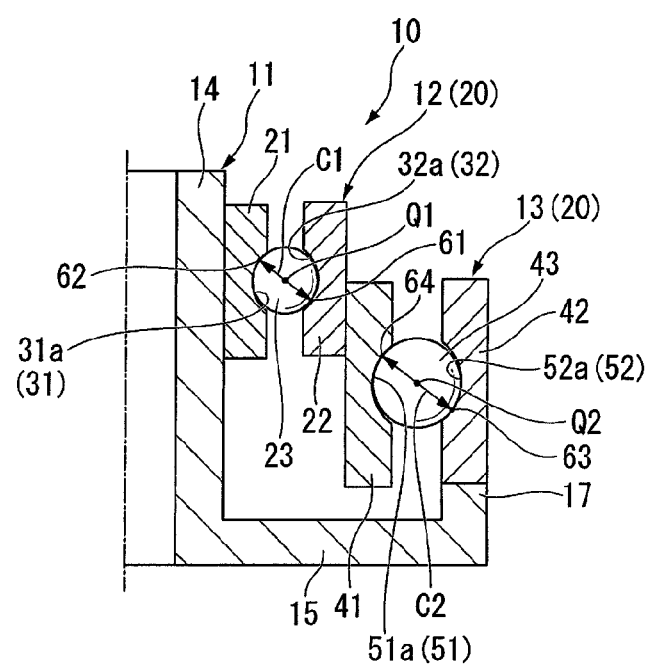
FIG. 3 is an enlarged section view of a bearing apparatus.

FIG. 3 is an enlarged section view of the bearing apparatus. FIG. 3 shows only the main portions to facilitate the understanding of the drawing.

As shown in FIG. 2 and FIG. 3, the first rolling bearing 12 and the second rolling bearing 13 described above are fixed under a pre-load along the axial direction.

Specifically, in the first rolling bearing 12, the rolling face 32a of the outer race 22 is in contact with the rolling elements 23 at a contact point 61 on the side of a center Q1 of the rolling elements 23 closer to the one end in the axial direction at all times, and the rolling face 31a of the inner race 21 is in contact with the rolling elements 23 at a contact point 62 on the side of the center Q1 of the rolling elements 23 closer to the other end in the axial direction. Thus, the pre-load direction is a direction indicated by an arrow C1 shown in FIG. 3.

In the second rolling bearing 13, the rolling face 52a of the outer race 42 is in contact with the rolling elements 43 at a contact point 63 on the side of a center Q2 of the rolling elements 43 closer to the one end in the axial direction, and the rolling face 51a of the inner race 41 is in contact with the rolling elements 43 at a contact point 64 on the side of the center Q2 of the rolling elements 43 closer to the other end in the axial direction. Thus, the pre-load direction is a direction indicated by an arrow C2 shown in FIG. 3.

Thus, in the first rolling bearing 12 and the second rolling bearing 13, no rattle occurs between the inner races 21 and 41 and the outer races 22 and 42 and the rolling elements 23 and 43 to improve the rigidity of the first rolling bearing 12 and the second rolling bearing 13. In the present embodiment, the pre-load direction C1 of the first rolling bearing 12 and the pre-load direction C2 of the second rolling bearing 13 are set substantially linearly.

The abovementioned arm 8 is pivotally supported on the bearing apparatus 10 formed in this manner. Specifically, as shown in FIG. 2, an attachment hole 8a passing along the axial direction is formed in the base end along the extending direction of the arm 8, and an expansion portion 8b protruding toward the one end in the axial direction is formed on an opening edge of the attachment hole 8a. The arm 8 is fitted externally to the first rolling bearing 12 through the attachment hole 8a, and with the end face on the one end along the axial direction of the expansion portion 8b abutting on the inner race 41 of the second rolling bearing 13, the inner peripheral face of the attachment hole 8a is fixed to the outer peripheral face of the outer race 22 of the first rolling bearing 12.

(Method of Manufacturing Bearing Apparatus)

Next, a method of manufacturing the above bearing apparatus is described.

Figure 4:
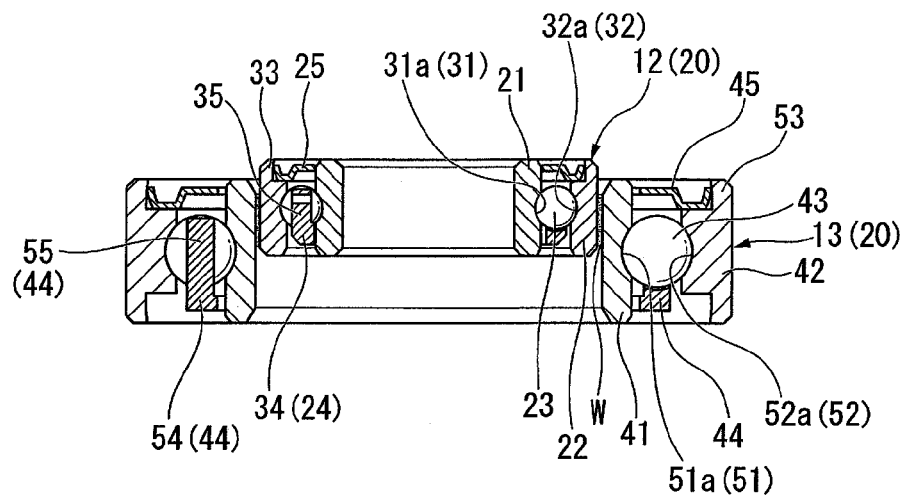
FIG. 4 is an explanatory diagram of a method of manufacturing the bearing apparatus.
Figure 5:
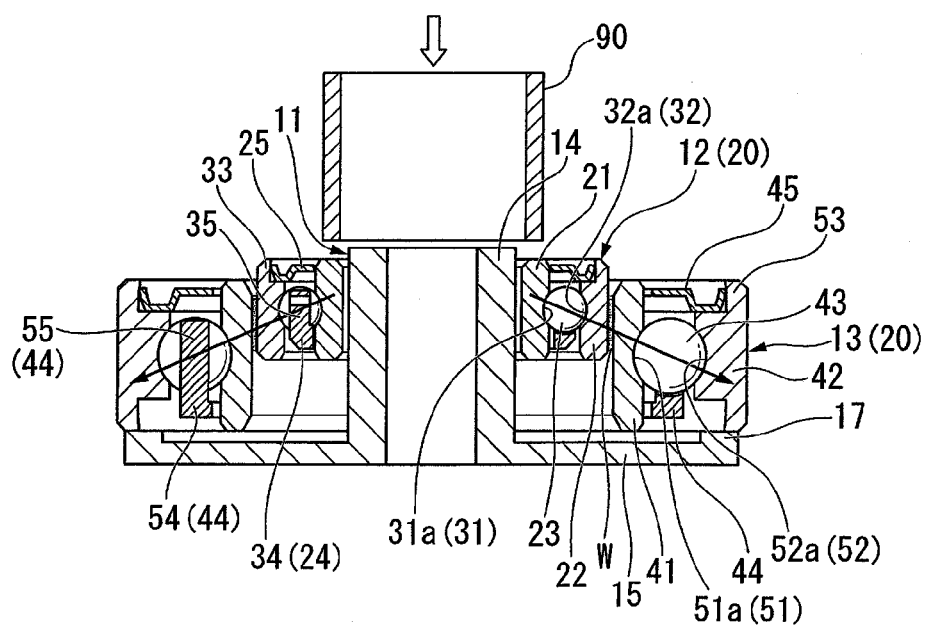
FIG. 5 is an explanatory diagram of the method of manufacturing the bearing apparatus.

FIG. 4 and FIG. 5 are explanatory diagrams for the method of manufacturing the bearing apparatus.

First, as shown in FIG. 4, the first rolling bearing 12 and the second rolling bearing 13 are fixed to each other. Specifically, the second rolling bearing 13 is fitted externally to the first rolling bearing 12, and the outer peripheral face of the outer race 22 of the first rolling bearing 12 and the inner peripheral face of the inner race 21 of the second rolling bearing 13 are fixed by the adhesive W. At this point, they are fixed such that the first rolling bearing 12 protrudes from the second rolling bearing 13 toward the other end in the axial direction.

Next, as shown in FIG. 5, with the first rolling bearing 12 and the second rolling bearing 13 fixed, the first rolling bearing 12 is fitted externally to the shaft 14. At this point, the first rolling bearing 12 is fitted externally to the position where the end face on the one end along the axial direction of the outer race 42 of the second rolling bearing 13 abuts on the protruding portion 17 of the support portion 15.

Next, the pre-load is applied to the first rolling bearing 12 and the second rolling bearing 13 by using a pre-load applying jig 90. The pre-load applying jig 90 is formed in a cylindrical shape with an inner diameter formed to be larger than the outer diameter of the shaft 14 and an outer diameter formed to be smaller than the outer diameter of the inner race 21 of the first rolling bearing 12. When the pre-load applying jig 90 is used to press the inner race 21 of the first rolling bearing 12 toward the one end in the axial direction, the inner race 21 of the first rolling bearing 12 is shifted toward the one end along the axial direction relative to the outer race 22. Thus, as shown in FIG. 3, in the first rolling bearing 12, the rolling face 32a of the outer race 22 and the rolling elements 23 are in contact with each other at the contact point 61 on the side of the center Q1 of the rolling elements 23 closer to the one end in the axial direction at all times, and the rolling face 31a of the inner race 21 and the rolling elements 23 are in contact with each other at the contact point 62 on the side of the center Q1 of the rolling elements 23 closer to the other end in the axial direction.

Since the inner race 21 of the first rolling bearing 12 is pressed, the inner race 41 of the second rolling bearing 13 fixed to the outer race 22 of the first rolling bearing 12 is also pressed toward the one end in the axial direction. The movement of the outer race 42 of the second rolling bearing 13 toward the one end in the axial direction is regulated by the protruding portion 17 of the support portion 15. Therefore, the inner race 41 of the second rolling bearing 13 is shifted toward the one end along the axial direction relative to the outer race 42. Thus, in the second rolling bearing 13, the rolling face 52a of the outer race 42 and the rolling elements 43 are in contact with each other at the contact point 63 on the side of the center Q2 of the rolling elements 43 closer to the one end in the axial direction, and the rolling face 51a of the inner race 41 and the rolling elements 43 are in contact with each other at the contact point 64 on the side of the center Q2 of the rolling elements 43 closer to the other end in the axial direction. The pre-load direction is a direction indicated by the arrow C2 in FIG. 3. Thus, the rolling bearings 12 and 13 are under the pre-loads in the directions of the arrows C1 and C2, respectively. In this state, as shown in FIG. 5, the outer peripheral face of the shaft 14 is fixed to the inner peripheral face of the inner race 21 in the first rolling bearing 12 by the adhesive W, and the outer race 42 of the second rolling bearing 13 is fixed to the protruding portion 17 of the support portion 15.

With these steps, the bearing apparatus 10 according to the present embodiment is completed.

Then, the arm 8 is fitted externally to the first rolling bearing 12, and the inner peripheral face of the attachment hole 8a of the arm 8 is fixed to the outer race 22 of the first rolling bearing 12 by an adhesive or the like. This supports the arm pivotally on the bearing apparatus 10. The arm 8 may be fixed at least one of the outer race 22 of the first rolling bearing 12 and the inner race 41 of the second rolling bearing 13.

In this manner, in the present embodiment, the first rolling bearing 12 fitted externally to the shaft 14 and the second rolling bearing 13 surrounding the first rolling bearing 12 from the outside and having the outer race 41 fixed to the outer race 22 of the rolling bearing 12 are installed with the pre-load applied.

According to the structure, as compared with the case where the first rolling bearing 12 and the second rolling bearing 13 are placed side by side in the axial direction, the width of the bearing apparatus 10 in the axial direction can be reduced while the performance of the bearing apparatus 10 is maintained. This can reduce the thickness of the bearing apparatus 10.

In addition, since the two rolling bearings 12 and 13 having different nominal diameters are combined, the bearing apparatus 10 can be provided at a lower cost without requiring the use of the special rolling bearing as described in JP-A-10-318255.

Since the rolling bearings 12 and 13 do not need be reduced in thickness, the rigidity of the rolling bearings 12 and 13 can be maintained.

According to the information recording/reproducing apparatus 1 of the present embodiment, since the bearing apparatus 10 described above is used, the information recording/reproducing apparatus 1 can be provided with a reduced thickness and at a lower cost.

Since the shaft 14 and the support portion 15 are formed integrally in the present embodiment, the number of parts can be reduced. Since the positioning of the shaft 14 and the support portion 15 is easily performed, the installation of the first rolling bearing 12 and the second rolling bearing 13 can be facilitated.

In addition, since the first rolling bearing 12 is fixed so as to protrude from the second rolling bearing 13 toward the other end in the axial direction, the directions of the pre-loads applied to the rolling bearings 12 and 13 are substantially linear. This can further increase the rigidity of the bearing apparatus 10 to suppress a rattle or a shift of the bearing apparatus 10 especially when a load is applied along the axial direction.

The technical scope of the present invention is not limited to the embodiment described above, and various changes can be made without departing from the spirit or scope of the present invention.

Figure 6:
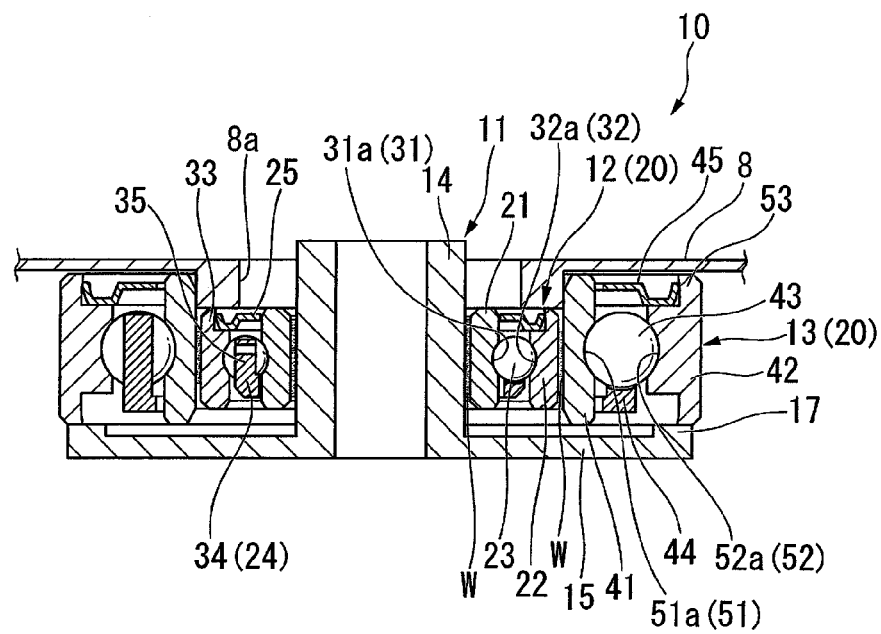
FIG. 6 is a section view corresponding to FIG. 2, according to another embodiment of the present invention.

For example, the above embodiment has been described with the first rolling bearing protruding from the second rolling bearing toward the other end along the axial direction. However, the present invention is not limited thereto. As shown in FIG. 6, the first rolling bearing 12 may be placed on the inner side in the axial direction of the second rolling bearing 13.

According to the structure, the bearing apparatus 10 can be further reduced in thickness as compared with the embodiment described above.

Figure 7:
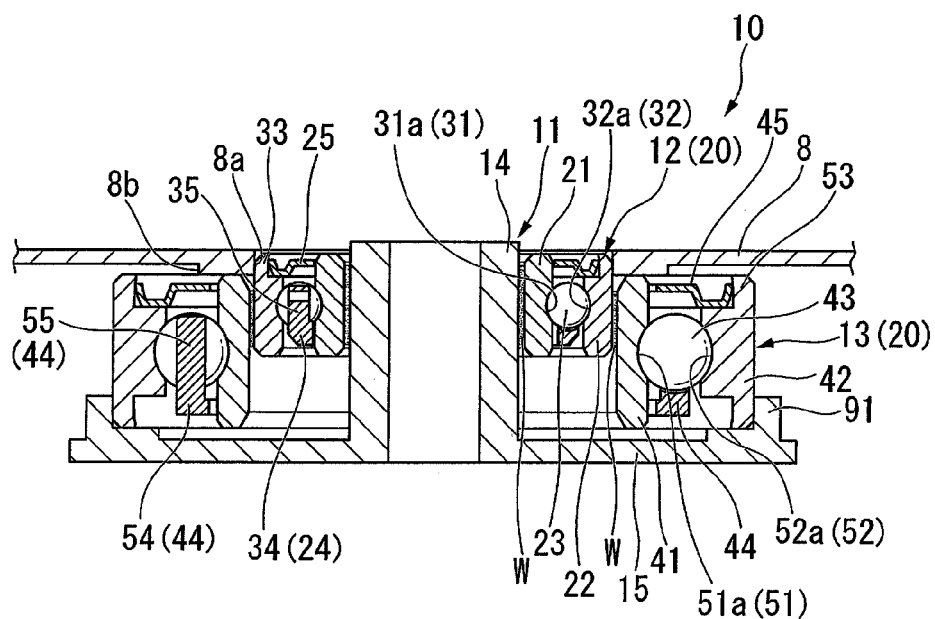
FIG. 7 is a section view corresponding to FIG. 2, according to another embodiment of the present invention.

As shown in FIG. 7, a ring portion 91 standing from the protruding portion 17 toward the other end in the axial direction may be formed over the entire periphery in the circumferential direction to hold the one end in the axial direction of the outer race 42 of the second rolling bearing 13 from the outside in the diameter direction.

According to the structure, the second rolling bearing 13 can be held from the outside in the diameter direction to achieve higher rigidity.

The size or the like of each of the first rolling bearing 12 and the second rolling bearing 13 can be changed in design as appropriate.

While the above embodiment has been described with the support portion 15 and the shaft 14 formed integrally, the present invention is not limited thereto, and the shaft 14 and the support portion 15 may be formed individually. For example, the support portion 15 (protruding portion 17) may stand from the bottom wall 9*a* of the housing 9.

The outer race 42 of the second rolling bearing 13 and the protruding portion 17 may not be fixed to each other, but slid in contact with each other.

The toll for fixing the rolling bearings 12 and 13 is not limited to the adhesive W and can be changed as appropriate.

For example, the specific structure of the information recording/reproducing apparatus 1 is not limited to the structure of the embodiment. The specific shape of the shaft 14 of the bearing apparatus 10 is not limited to the shape of the embodiment.

While the above embodiment has been described with the fixing of the shields 25 and 45 of the rolling bearings 12 and 13 to the outer races 22 and 42, respectively, they may be fixed to the inner races 21 and 41.

While the above embodiment has been described with a so-called one-side shield in which the shields 25 and 45 of the rolling bearings 12 and 13 are placed only on the other end along the axial direction, the present invention is not limited thereto, and a so-called double-side shield may be used in which the shields 25 and 45 are placed on each side along the axial direction. The use of the one-side shield as in the embodiment can further reduce the thickness of the rolling bearings 12 and 13.

What is claimed is:

1. A bearing apparatus comprising:
    a shaft;
    a first rolling bearing fitted externally to the shaft;
    a second rolling bearing having a larger diameter than that of the first rolling bearing and fitted externally to the first rolling bearing; and
    a support portion supporting an outer race of the second rolling bearing on one end side in an axial direction,
    wherein an inner race of the first rolling bearing is fixed to the shaft, and an outer race of the first rolling bearing is fixed to an inner race of the second rolling bearing,
    wherein in the first rolling bearing, the outer race and rolling elements are in contact with each other on the side of a center of the rolling elements closer to the one end side in the axial direction, and the inner race and the rolling elements are in contact with each other on the side of the center of the rolling elements closer to the other end side in the axial direction, and
    wherein in the second rolling bearing, the outer race and rolling elements are in contact with each other on the side of a center of the rolling elements closer to the one end side in the axial direction, and the inner race and the rolling elements are in contact with each other on the side of the center of the rolling elements closer to the other end side in the axial direction.

2. The bearing apparatus according to claim 1, wherein the first rolling bearing is placed to protrude from the second rolling bearing toward the other end side along the axial direction.

3. The bearing apparatus according to claim 2, wherein the shaft and the support portion are integrally formed.

4. The bearing apparatus according to claim 1, wherein the shaft and the support portion are integrally formed.

5. An information recording/reproducing apparatus comprising:
    a bearing apparatus comprising:
        a shaft;
        a first rolling bearing fitted externally to the shaft;
        a second rolling bearing having a larger diameter than that of the first rolling bearing and fitted externally to the first rolling bearing; and
        a support portion supporting an outer race of the second rolling bearing on one end side in an axial direction,
        wherein an inner race of the first rolling bearing is fixed to the shaft, and an outer race of the first rolling bearing is fixed to an inner race of the second rolling bearing,
        wherein in the first rolling bearing, the outer race and rolling elements are in contact with each other on the side of a center of the rolling elements closer to the one end side in the axial direction, and the inner race and the rolling elements are in contact with each other on the side of the center of the rolling elements closer to the other end side in the axial direction, and
        wherein in the second rolling bearing, the outer race and rolling elements are in contact with each other on the side of a center of the rolling elements closer to the one end side in the axial direction, and the inner race and the rolling elements are in contact with each other on the side of the center of the rolling elements closer to the other end side in the axial direction,
    a housing connected to the shaft;
    a pivotal member fixed to at least one of the outer race of the first rolling bearing and the inner race of the second rolling bearing; and
    a slider mounted on the pivotal member for recording and reproducing information to and from a magnetic recording medium.

* * * * *